United States Patent
Ohsaki et al.

(10) Patent No.: US 8,962,822 B2
(45) Date of Patent: Feb. 24, 2015

(54) MODIFIED POLYURONIC ACIDS AND SALTS THEREOF

(75) Inventors: Kouji Ohsaki, Wakayama (JP); Kazuaki Sato, Wakayama (JP); Yuri Okutani, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/813,051

(22) PCT Filed: Oct. 14, 2011

(86) PCT No.: PCT/JP2011/074240
§ 371 (c)(1),
(2), (4) Date: Apr. 2, 2013

(87) PCT Pub. No.: WO2012/057007
PCT Pub. Date: May 3, 2012

(65) Prior Publication Data
US 2013/0245247 A1   Sep. 19, 2013

(30) Foreign Application Priority Data

Oct. 28, 2010 (JP) ................................. 2010-242703
Aug. 22, 2011 (JP) ................................. 2011-180635

(51) Int. Cl.
| C07H 3/00 | (2006.01) |
| C07H 5/02 | (2006.01) |
| C07H 5/06 | (2006.01) |
| C08B 37/00 | (2006.01) |
| C08B 15/04 | (2006.01) |

(52) U.S. Cl.
CPC ............... C08B 37/006 (2013.01); C08B 15/04 (2013.01)
USPC .............................. 536/53; 536/122; 536/123

(58) Field of Classification Search
CPC ...................................................... C08B 37/006
USPC ............................................ 536/53, 122, 123
See application file for complete search history.

(56) References Cited

U.S. PATENT DOCUMENTS

2005/0192434 A1   9/2005   Buchanan et al.

FOREIGN PATENT DOCUMENTS

| EP | 0 307 915 A2 | 3/1989 |
| EP | 0 422 618 A1 | 4/1991 |
| EP | 1 191 039 A1 | 3/2002 |
| JP | 3-12401 A | 1/1991 |
| JP | 4-130101 A | 5/1992 |
| JP | 2007-515515 A | 6/2007 |
| JP | 2009-263641 A | 11/2009 |

OTHER PUBLICATIONS

International Search Report for PCT/JP2011/074240 dated Jun. 11, 2012.

*Primary Examiner* — Elli Peselev
(74) *Attorney, Agent, or Firm* — Birch, Stewart, Kolasch & Birch, LLP

(57) ABSTRACT

The present invention provides a modified polyuronic acid represented by formula (1) or a salt thereof which is excellent in surface activity: wherein $R^1$ is a hydrogen atom, a hydrocarbon group having 1 to 40 carbon atoms or the like; X is an oxygen atom, a sulfur atom or a —NH— group, with the proviso that a ratio value of [m/(m+n)] is from 0.3 to 1.0, and a plurality of the $R^1$ groups being present in a molecule of the modified polyuronic acid or the salt thereof may be the same or different from each other but all of the $R^1$ groups are not hydrogen atoms at the same time.

(1)

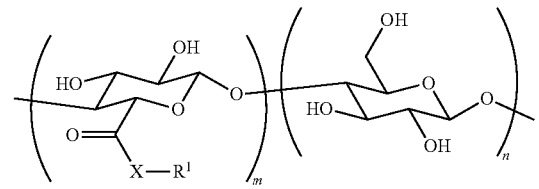

12 Claims, No Drawings

MODIFIED POLYURONIC ACIDS AND SALTS THEREOF

FIELD OF THE INVENTION

The present invention relates to modified polyuronic acids and salts thereof.

BACKGROUND OF THE INVENTION

Emulsions have become more important in various industrial applications such as cosmetics, food products and drugs. However, the emulsions tend to have such a problem that an emulsified condition thereof becomes unstable with time. To solve this problem, various attempts have been conventionally made. As one of the conventional attempts, there is known the method in which a hydrophobic modified polysaccharide obtained by reacting a polysaccharide with a hydrophobic agent, etc., is compounded in the emulsions.

As to the hydrophobic modified polysaccharides, for example, Patent Document 1 discloses the method for producing a modified cellulose ether in which a water-soluble cellulose ether containing a hydroxyalkyl group is reacted with a glycidyl ether containing an alkyl group having 6 to 26 carbon atoms.

Also, Patent Document 2 discloses the method for producing a carboxymethyl alkyl cellulose in which a carboxymethyl cellulose metal salt is reacted with an alkyl halide.

Patent Document 3 discloses the method for producing a polyuronic acid salt in which a low-crystalline cellulose derivative having a crystallinity of 30% or less is subjected to oxidation reaction in the presence of an N-oxyl compound to selectively oxidize a primary hydroxyl group bonded at the C6-position of an anhydroglucose unit constituting a main chain of a cellulose.

Patent Document 4 discloses the method for producing a modified polyuronic acid salt in which a primary oxidant such as an N-oxyl compound and manganese acetate and a terminal oxidant such as peracetic acid are added to a cellulose ester mixture having a pH of less than 4 to convert the C6 hydroxyl group of an anhydroglucose unit of a cellulose to a formyl group or a carboxy group.

Patent Document 1: JP 3-12401A
Patent Document 2: JP 4-130101A
Patent Document 3: JP 2009-263641A
Patent Document 4: JP 2007-515515A

SUMMARY OF THE INVENTION

The present invention relates to a modified polyuronic acid represented by the following general formula (1) or a salt thereof.

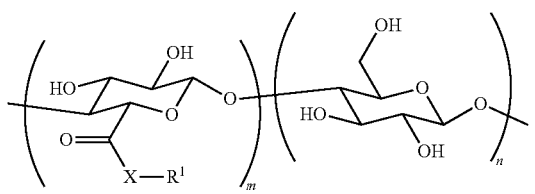

(1)

wherein $R^1$ is a hydrogen atom, a hydrocarbon group having 1 to 40 carbon atoms, a —$CH_2$—CH(OH)—$R^2$ group or a —$CH_2$—CH(OH)—$CH_2$—O—$R^2$ group wherein $R^2$ is a hydrocarbon group having 1 to 40 carbon atoms; X is an oxygen atom, a sulfur atom or a —NH— group; m is a number indicating an average polymerization degree of an anhydroglucuronic acid represented by the following general formula (2) and/or a derivative thereof, and n is a number indicating an average polymerization degree of an anhydroglucose, with the proviso that a ratio value of [m/(m+n)] is from 0.3 to 1.0, and a plurality of the $R^1$ groups being present in a molecule of the modified polyuronic acid or the salt thereof may be the same or different from each other but all of the $R^1$ groups are not hydrogen atoms at the same time:

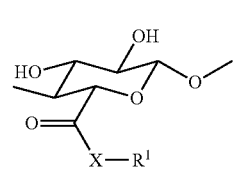

(2)

wherein X and $R^1$ are respectively the same as defined above.

DETAILED DESCRIPTION OF THE INVENTION

The modified cellulose ether described in Patent Document 1 is used as a thickening agent, but fails to exhibit a sufficient surface activity since a hydrophilic group contained therein is a hydroxyl group only.

The hydrophobic modified carboxymethyl alkyl cellulose obtained by the method described in Patent Document 2 is used as a coating agent for drugs, but fails to exhibit a sufficient surface activity since a hydrophilic group is randomly introduced thereinto.

The polyuronic acid salt obtained by the method described in Patent Document 3 has a capability of dispersing inorganic substances, etc., therein, but exhibits a low surface activity since it contains no hydrophobic group.

The polyuronic acid salt obtained by the method described in Patent Document 4 fails to exhibit a sufficient surface activity since a hydrophobic group is randomly introduced thereinto.

The present inventors have found that a modified polyuronic acid having a specific structure or a salt thereof can exhibit an excellent surface activity.

Thus, the present invention relates to the modified polyuronic acid represented by the above general formula (1) or the salt thereof.

[Modified Polyuronic Acid]

The modified polyuronic acid has the structure represented by the general formula (1) which is formally such a structure in which a hydrophobic group is introduced into a carboxy group of a polyuronic acid directly or through a coupling group.

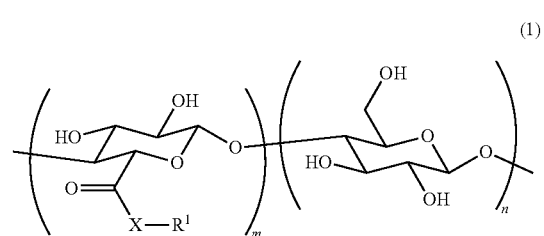

(1)

wherein R¹ is a hydrogen atom, a hydrocarbon group having 1 to 40 carbon atoms, a —CH$_2$—CH(OH)—R² group or a —CH$_2$—CH(OH)—CH$_2$—O—R² group wherein R² is a hydrocarbon group having 1 to 40 carbon atoms; X is an oxygen atom, a sulfur atom or a —NH— group; m is a number indicating an average polymerization degree of an anhydroglucuronic acid represented by the following general formula (2) and/or a derivative thereof, and n is a number indicating an average polymerization degree of an anhydroglucose, with the proviso that a ratio value of [m/(m+n)] is from 0.3 to 1.0, and a plurality of the R¹ groups being present in a molecule of the modified polyuronic acid or the salt thereof may be the same or different from each other but all of the R¹ groups are not hydrogen atoms at the same time:

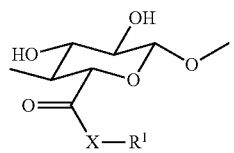

(2)

wherein X and R¹ are respectively the same as defined above.

In the general formula (1), when R¹ is a hydrocarbon group having 1 to 40 carbon atoms, the number of carbon atoms in the hydrocarbon group is preferably from 3 to 36, more preferably from 4 to 24 and still more preferably from 5 to 18 from the viewpoint of a good surface activity.

Examples of the hydrocarbon group include linear or branched alkyl groups, linear or branched alkenyl groups and aryl groups. Among these hydrocarbon groups, from the viewpoints of facilitated production and a good surface activity, preferred are linear or branched alkyl groups and alkenyl groups, more preferred are linear or branched alkyl groups, and still more preferred are linear alkyl groups.

Specific examples of the linear alkyl groups include methyl, ethyl, n-propyl, n-butyl, n-pentyl, n-hexyl, n-octyl, n-decyl, n-dodecyl, n-tetradecyl, n-hexadecyl, n-octadecyl, n-eicosyl, n-docosyl, n-tetracosyl, n-triacontyl, n-hexatriacontyl and n-tetracontyl.

Specific examples of the branched alkyl groups include isohexyl, isoheptyl, isooctyl, isononyl, 3,5-dimethyloctyl, isodecyl, isostearyl, 2-hexyldecyl, 2-octyldodecyl, 2-heptylundecyl, 2-decyltetradecyl, 2-dodecylhexadecyl, 2-tetradecyloctadecyl and 2-tetradecylbehenyl.

Specific examples of the aryl groups include phenyl, biphenyl, naphthyl, anthranyl, terphenyl, pyrenyl, quinolyl, quinoxalinyl, benzoquinoxalinyl, a pyrimidine group, a pyrrole group, furanyl and thiophenyl.

In the general formula (1), when R¹ is a —CH$_2$—CH(OH)—R² group or a —CH$_2$—CH(OH)—CH$_2$—O—R² group wherein R² is a hydrocarbon group having 1 to 40 carbon atoms, the preferred examples and specific examples of R² as a hydrocarbon group having 1 to 40 carbon atoms are the same as those of R¹ as a hydrocarbon group having 1 to 40 carbon atoms.

In the general formula (1), X is preferably an oxygen atom or a —NH— group from the viewpoints of facilitated production, burden on facilities upon production and good availability of raw materials.

In the general formula (1), R¹ other than hydrogen is preferably a hydrocarbon group having 1 to 40 carbon atoms, more preferably a linear or branched alkyl group or alkenyl group having 4 to 24 carbon atoms, still more preferably a linear or branched alkyl group or alkenyl group having 5 to 18 carbon atoms, further still more preferably a linear or branched alkyl group having 5 to 18 carbon atoms, and especially preferably a linear alkyl group having 5 to 18 carbon atoms from the viewpoint of a good surface activity of the modified polyuronic acid according to the present invention.

In the general formula (1), the hydrocarbon group having 1 to 40 carbon atoms as R¹ and the hydrocarbon group having 1 to 40 carbon atoms as R² are considered to act as a hydrophobic group when the modified polyuronic acid according to the present invention is used as a high-molecular surfactant. For this reason, the hydrocarbon group having 1 to 40 carbon atoms as R¹ and the hydrocarbon group having 1 to 40 carbon atoms as R² are hereinafter occasionally referred to merely as a "hydrophobic group", and the remaining portion of the —CH$_2$—CH(OH)—R² group or the —CH$_2$—CH(OH)—CH$_2$—O—R² group except for the hydrocarbon group R² is hereinafter occasionally referred to as a "coupling group".

The substitution degree of the hydrophobic group is preferably from 0.01 to 0.9, more preferably from 0.05 to 0.7 and still more preferably from 0.1 to 0.5 from the viewpoints of good surface activity and water solubility. The substitution degree of the hydrophobic group as used herein means the value obtained by dividing an average value (a) of the number of the hydrophobic groups in the modified polyuronic acid according to the present invention, i.e., the number of hydrocarbon groups having 1 to 40 carbon atoms per a molecule thereof, by a sum of m and n in the general formula (1), i.e., a ratio of the average value (a) of the number of the hydrocarbon groups per a molecule thereof to (m+n) [a/(m+n)].

The substitution degree of the hydrophobic group may be calculated from the values measured by ¹H-NMR as described in Examples below.

Also, the ratio value of [m/(m+n)] is from 0.3 to 1.0 from the viewpoints of good surface activity and water solubility. The ratio value of [m/(m+n)] is preferably 0.5 or more, and more preferably 0.6 or more, and the upper limit of the ratio value is preferably 0.99 or less and more preferably 0.95 or less from the viewpoint of facilitated production.

The ratio value of [m/(m+n)] can be obtained as a sum of the substitution degree of the hydrophobic group and the below-mentioned substitution degree of a carboxy group in the modified polyuronic acid.

The substitution degree of a carboxy group in the modified polyuronic acid according to the present invention (hereinafter occasionally referred to merely as a "carboxy group substitution degree (MPU)") is preferably from 0.1 to 0.99, more preferably from 0.3 to 0.9 and still more preferably from 0.4 to 0.8 from the viewpoints of good surface activity and water solubility. The carboxy group substitution degree (MPU) as used herein means the value obtained by dividing the number of carboxy groups per a molecule of the modified polyuronic acid by the number of sugar units constituting a main chain of the modified polyuronic acid, and may be calculated from the equivalent number of a basic compound used for neutralization titration of the modified polyuronic acid. More specifically, the carboxy group substitution degree (MPU) is the value calculated from the amount of the carboxy group per a unit weight of the modified polyuronic acid which is measured by a neutralization titration method described in Examples below, according to the following calculation formula (1).

Carboxy group substitution degree($MPU$)=[162.1+$B$×($x$)]×$A$/(1−14.0×$A$)  (1)

In the above calculation formula (1), A is the amount (mol/g) of the carboxy group obtained by the neutralization titration; B is a sum of a molecular weight of the hydrophobic group and a molecular weight of the coupling group; and (x) is the substitution degree of the hydrophobic group. In this case, if various kinds of hydrophobic groups and coupling groups are present in the molecule, the above B may be determined by using respective average values of molecular weights of these groups.

Meanwhile, examples of the basic compound used for the neutralization include alkali metal or alkali earth metal hydroxides such as sodium hydroxide, potassium hydroxide and magnesium hydroxide, ammonia and amine compounds.

The weight-average molecular weight (Mw) of the modified polyuronic acid according to the present invention is preferably from 5000 to 500,000, more preferably from 5000 to 300,000, still more preferably from 5000 to 200,000, further still more preferably from 6000 to 100,000 and especially preferably from 10,000 to 50,000 from viewpoints of a good solubility in water and a good surface activity. Meanwhile, the weight-average molecular weight (Mw) may be determined from a molecular weight in terms of a pullulan as measured by gel permeation chromatography (GPC) using an eluent containing a 0.2M phosphoric acid buffer solution and acetonitrile at a volume ratio of 90/10. The details of GPC are described in Examples below.

In the modified polyuronic acid according to the present invention, a part or whole of the carboxy groups contained therein may be in the form of a salt thereof. The counter ion of the salt is not particularly limited. Specific examples of the counter ion of the salt include alkali metal ions such as a lithium ion, a potassium ion and a sodium ion; alkali earth metal ions such as a magnesium ion and a calcium ion; an ammonium ion; protonated products of primary, secondary and tertiary amines containing an alkyl group having 1 to 6 carbon atoms which may be substituted with a hydroxyl group, such as dimethyl amine, monoethanol amine, diethanol amine, trimethyl amine and triethyl amine; and quaternary ammonium ions containing an alkyl group having 1 to 6 carbon atoms which may be substituted with a hydroxyl group, such as a tetramethyl ammonium ion and a dimethyldiethanol ammonium ion.

From the viewpoints of a good water solubility of the salt of the modified polyuronic acid according to the present invention, among these counter ions, preferred are alkali metal ions such as a lithium ion, a potassium ion and a sodium ion, and an ammonium ion. In addition, from the viewpoints of a good availability and facilitated handling upon production, more preferred are a potassium ion, a sodium ion and an ammonium ion, and still more preferred is a sodium ion.

When a plurality of carboxy group salts are present in the salt of the modified polyuronic acid, the counter ions bonded thereto may be the same or different from each other.

[Method for Producing Modified Polyuronic Acid]

The modified polyuronic acid according to the present invention can be obtained by introducing the hydrophobic group into polyuronic acid.

The polyuronic acid used as a raw material (hereinafter occasionally referred to merely as a "raw polyuronic acid") is not particularly limited, and any of natural products or extracts thereof, chemically synthesized products and products synthesized using enzymes and micro-organisms may be used as long as they have a structure in which a part or whole of hydroxyl groups bonded to the C6 position of an anhydroglucose constituting a cellulose are oxidized.

(Raw Polyuronic Acid)

A part or whole of carboxy groups contained in the raw polyuronic acid may be in the form of a salt thereof. The kind of counter ion of the salt of the raw polyuronic acid and preferred examples thereof are the same as the kind of counter ion of the salt of the above modified polyuronic acid and preferred examples thereof.

The carboxy group substitution degree of the raw polyuronic acid (hereinafter occasionally referred to merely as a "carboxy group substitution degree (PU)") is preferably 0.3 or more, more preferably 0.5 or more, and still more preferably 0.6 or more from the viewpoints of good surface activity and water solubility. The upper limit of the carboxy group substitution degree of the raw polyuronic acid is 1.0 or less, and preferably 0.99 or less and more preferably 0.95 or less from the viewpoint of facilitated production.

The carboxy group substitution degree (PU) as used herein means the value obtained by dividing the number of carboxy groups per a molecule of the raw polyuronic acid by the number of sugar units constituting a main chain of the polyuronic acid, and may be calculated from an equivalent number of a basic compound used for neutralization titration of the polyuronic acid. More specifically, the carboxy group substitution degree (PU) is calculated from the amount of carboxy groups per a unit weight of the polyuronic acid as measured by the neutralization titration method described in Examples below, according to the following calculation formula (2).

$$\text{Carboxy group substitution degree}(PU)=162.1 \times D/(1-14.0 \times D) \quad (2)$$

In the above calculation formula (2), D is an amount (mol/g) of carboxy groups as measured by the neutralization titration.

Meanwhile, examples of the basic compound used for the neutralization include alkali metal or alkali earth metal hydroxides such as sodium hydroxide, potassium hydroxide and magnesium hydroxide, ammonia and amine compounds.

The carboxy group substitution degree (PU) is substantially the same as the above ratio value of [m/(m+n)].

The weight-average molecular weight of the polyuronic acid is preferably from 5,000 to 500,000, more preferably from 5,000 to 200,000, still more preferably from 6,000 to 100,000 and further still more preferably from 10,000 to 50,000 from the viewpoints of good solubility in water and good surface activity. Meanwhile, the weight-average molecular weight of the raw polyuronic acid may be measured by the same method as used for measuring the weight-average molecular weight of the modified polyuronic acid.

The raw polyuronic acid is preferably obtained by oxidizing a part or whole of primary hydroxyl groups bonded to the C6 position of an anhydroglucose constituting a cellulose from the viewpoint of a good availability. Further, from the viewpoint of a good water solubility of the resulting modified polyuronic acid, the cellulose is preferably a low-crystalline cellulose.

(Low-Crystalline Cellulose)

In the present invention, the "low-crystalline cellulose" means a cellulose having such a condition that a proportion of an amorphous moiety in the cellulose structure is large, more specifically, a cellulose having a crystallinity of 30% or less as calculated according to the following calculation formula (3).

$$\text{Crystallinity}(\%)=[(I_{22.6}-I_{18.5})/I_{22.6}] \times 100 \quad (3)$$

wherein $I_{22.6}$ is a diffraction intensity of a lattice plane (002 plane) as measured at a diffraction angle $2\theta$ of 22.6° in X-ray diffraction analysis; and $I_{18.5}$ is a diffraction intensity of an amorphous moiety as measured at a diffraction angle $2\theta$ of 18.5° in X-ray diffraction analysis.

The above crystallinity is expressed by using the ratio between the X-ray diffraction intensity of the 002 plane of an I-type crystal of a cellulose and the X-ray diffraction intensity of the amorphous moiety thereof as an index thereof. Therefore, if all of crystals in the cellulose have an I-type crystal form, the crystallinity thereof theoretically lies within the range of from 0 to 100%. However, in fact, a plurality of crystal forms are present in the cellulose. In the case where the crystals other than the I-type crystals are broken and amorphized to a sufficient extent, the crystallinity might become a negative value. In the present invention, when the crystallinity calculated according to the above formula (3) is a negative value, the crystallinity is regarding as being 0%.

When the crystallinity is 30% or less, the oxidation reaction of the cellulose can proceed very smoothly, so that the modified polyuronic acid obtained by introducing a hydrophobic group into a polyuronic acid has a good water solubility and therefore can exhibit a high surface activity. From the viewpoint of a good reactivity upon the oxidation reaction, the crystallinity of the cellulose is preferably 30% or less, more preferably 20% or less, still more preferably from 0 to 10% and especially preferably 0%.

(Production of Low-Crystalline Cellulose)

The low-crystalline cellulose used as the raw material may be available from any sources without particular limitations. However, most of celluloses contained in readily available cellulose-containing raw materials such as pulps are usually celluloses having a crystallinity as high as 60% or more. Therefore, from the viewpoint of a good availability, there is preferably used the method of pulverizing the cellulose-containing raw materials having a crystallinity of 60% or more using a pulverizer to convert the celluloses into low-crystalline celluloses as desired.

Examples of the cellulose-containing raw materials include timbers such as various wood chips, prunings, thinnings and branches of various trees, building wastes and factory wastes; pulps such as wood pulps obtained from wood and cotton linter pulps obtained from fibers around cotton seeds; papers such as newspapers, corrugated boards, magazines and wood-free papers; stems and leaves of plants such as rice straws and corn stems; and shells of plants such as chaffs, palm shells and coconut shells. Among these materials, from the viewpoints of a good surface activity of the resulting modified polyuronic acid according to the present invention and high productivity upon production thereof, preferred are pulps and timbers.

In the cellulose-containing raw materials used in the present invention, the content of cellulose in a residual component obtained by removing water from the cellulose-containing raw materials is preferably 20% by mass or larger, more preferably 40% by mass or larger, still more preferably 60% by mass or larger and further still more preferably 75% by mass or larger from the viewpoint of a high productivity, and an upper limit of the content of cellulose in the residual component is 100% by mass. The commercially available pulps have a high cellulose purity, and therefore the content of the residual component obtained by removing water therefrom is substantially the same as the content of cellulose in the residual component. Thus, in the present invention, the content of the residual component obtained by removing water from the pulps is regarded as the content of cellulose therein.

The mill (or pulverizer) used for obtaining the low-crystalline celluloses is preferably a media-type mill. The media-type mills are classified into a container driving-type mill and a media stirring-type mill. Examples of the container driving-type mill include a rolling mill, a vibration mill, a planetary mill and a centrifugal fluid mill. Among these container driving-type mills, from the viewpoints of a good grinding efficiency and a good productivity, preferred is the vibration mill. Examples of the media stirring-type mill include tower-type mills such as a tower mill; agitation tank-type mills such as an attritor, an aquamizer and a sand grinder; flow tank-type mills such as a Visco mill and a pearl mill; flow tube-type mills; annular-type mills such as a co-ball mill; and continuous-type dynamic mills. Among these media stirring-type mills, form the viewpoints of a high grinding efficiency and a good productivity, preferred are the agitation tank-type mills.

The above types of the mills will be understood by referring to "Progress of Chemical Engineering; 30th Collection; Control of Microparticles", the Society of Chemical Engineers, Japan, Tokai Division, Oct. 10, 1996, Maki-Shoten.

The material of the media used in the mills is not particularly limited. Examples of the material of the media include iron, stainless steel, alumina, zirconia, silicon carbide, silicon nitride and glass.

When using balls as the media for the mill, the outer diameter of the balls is preferably from 0.1 to 100 mm and more preferably from 0.5 to 50 mm. When the size of the balls lies within the above specified range, a desired grinding force can be attained, and the low-crystalline celluloses can be efficiently produced without contamination of the cellulose-containing raw material owing to inclusion of fragments of the balls thereinto.

The media for the mill may be of not only a ball shape but also a rod shape or the like. When the rod-shaped media are used, the diameter thereof preferably lies within the same range as the diameter of the ball-shaped media.

The filling ratio of the media in the mill varies depending upon the kind of the mill used, and is preferably from 10 to 97% and more preferably from 15 to 95%. When the filling ratio of the media lies within the above specified range, the frequency of contact between the cellulose-containing raw material and the media can be increased, and the efficiency of reducing a crystallinity of the celluloses can be enhanced without inhibiting a motion of the media. The "filling ratio" as used herein means a ratio of an apparent volume of the media to a volume of an agitation portion of the mill.

The size of the cellulose-containing raw material to be treated by the mill is not particularly limited, and is preferably from 1 μm to 50 mm, more preferably from 5 μm to 20 mm and especially preferably from 7 μm to 10 mm from the viewpoint of a good handling property.

The treating time in the mill varies depending upon kind of the mill used as well as kind, size and filling ratio of the media and, therefore, is not particularly limited. From the viewpoint of reducing the crystallinity of the celluloses, the treating time is preferably from 0.01 to 50 h, more preferably from 0.05 to 20 h and still more preferably from 0.1 to 10 h. The treating temperature is also not particularly limited, and is preferably from 5 to 250° C. and more preferably from 10 to 200° C. from the viewpoint of preventing heat deterioration of the cellulose-containing raw material.

The polymerization degree of the low-crystalline celluloses is preferably from 10 to 1000, more preferably from 20 to 500 and still more preferably 30 to 200 in terms of a viscosity-average polymerization degree as measured by a copper-ammonia method, from the viewpoints of a high dissolvability in water and a high surface activity of the resulting modified polyuronic acid according to the present invention.

From the viewpoint of allowing the oxidation reaction to proceed smoothly, the average particle size of the low-crystalline celluloses is preferably 300 μm or less, more preferably 150 μm or less and still more preferably 50 μm or less in terms of a median diameter as determined from the measurement of laser diffraction/scattering particle size distribution. However, from the viewpoint of a good handling property, the average particle size of the low-crystalline celluloses is preferably 20 μm or more, and more preferably 25 μm or more.

(Production of Polyuronic Acid by Oxidation of Celluloses)

As the method of oxidizing a part or whole of primary hydroxyl groups bonded at the C6 position of an anhydroglucose constituting the celluloses, there may be used (i) the method in which the celluloses are subjected to oxidation reaction using oxygen in the presence of a platinum catalyst, and (ii) the method in which the celluloses are subjected to oxidation reaction using a nitrogen oxide. Specific examples of the oxidation reaction method (ii) include the method in which the celluloses are subjected to oxidation reaction using nitric acid or an N-oxyl compound, etc. Among these oxidation reaction methods, from the viewpoints of a high positional selectivity and uniformity of the reaction as well as smooth proceeding of the oxidation reaction under moderate conditions, preferred is the method in which the oxidation reaction is carried out in the presence of the N-oxyl compound as a catalyst and, if required, a co-oxidizer or a co-catalyst.

The N-oxyl compound is preferably in the form of an N-oxide of a hindered amine and especially preferably a heterocyclic N-oxyl compound containing a bulky group at the α-position of an amino group thereof.

(N-Oxyl Compound)

The heterocyclic N-oxyl compound is preferably at least one compound selected from the group consisting of a piperidine-oxyl compound containing an alkyl group having 1 or 2 carbon atoms, a pyrrolidine-oxyl compound, an imidazoline-oxyl compound and an aza-adamantane compound.

Among these compounds, from the viewpoint of a good reactivity, preferred is the piperidine-oxyl compound containing an alkyl group having 1 or 2 carbon atoms. Examples of the piperidine-oxyl compound containing an alkyl group having 1 or 2 carbon atoms include di-tert-alkyl nitroxyl compounds such as 2,2,6,6-tetraalkyl piperidine-1-oxyl (TEMPO), 4-hydroxy-2,2,6,6-tetraalkyl piperidine-1-oxyl, 4-alkoxy-2,2,6,6-tetraalkyl piperidine-1-oxyl, 4-benzoyloxy-2,2,6,6-tetraalkyl piperidine-1-oxyl and 4-amino-2,2,6,6-tetraalkyl piperidine-1-oxyl. Among these piperidine-oxyl compounds, more preferred are 2,2,6,6-tetramethyl piperidine-1-oxyl (TEMPO), 4-hydroxy-2,2,6,6-tetramethyl piperidine-1-oxyl and 4-methoxy-2,2,6,6-tetramethyl piperidine-1-oxyl, and especially preferred is 2,2,6,6-tetramethyl piperidine-1-oxyl (TEMPO).

In the present invention, the N-oxyl compound may be present in a catalytic amount in the reaction, and is used in an amount of preferably from 0.001 to 10% by mass, more preferably from 0.01 to 9% by mass, still more preferably from 0.1 to 8% by mass and further still more preferably from 0.5 to 5% by mass on the basis of the low-crystalline cellulose.

(Co-Oxidizer, Etc.)

In the present invention, a co-oxidizer may also be used in order to oxidize a reduced species of the N-oxyl compound. As the co-oxidizer, from the viewpoints of a good solubility, a high reaction rate, etc., when adjusting the solvent in an alkali range, there may be used oxygen or air; peroxides; halogens; hypohalous acid, halous acids, halogen peracids or alkali metal salts or alkali earth metal salts thereof, halogen oxides; and nitrogen oxides.

The amount of the co-oxidizer used may be selectively determined according to the desired carboxy group substitution degree of the polyuronic acid, and is not particularly limited because the yield of the oxidation reaction may vary depending upon the reaction conditions. The co-oxidizer is preferably used in an amount of from 0.1 to 10.0 mol and more preferably from 0.5 to 5.0 mol per 1 mol of an anhydroglucose unit of the low-crystalline cellulose as the raw material.

In addition, a co-catalyst may also be used in order to conduct the oxidation reaction in a more efficient manner. Examples of the co-catalyst include bromides such as sodium bromide and potassium bromide; and iodides such as sodium iodide and potassium iodide. The co-catalyst may be used in an effective amount capable of exhibiting its functions, but the amount of the co-catalyst used is not particularly limited.

(Solvent)

The oxidation reaction is preferably carried out by dispersing the low-crystalline cellulose in a solvent. Examples of the solvent include water; alcohols having 1 to 6 carbon atoms and preferably 3 to 6 carbon atoms such as isopropanol, isobutanol, and tert-butanol; ketones having 3 to 6 carbon atoms such as acetone, methyl ethyl ketone and methyl isobutyl ketone; linear or branched saturated hydrocarbons or unsaturated hydrocarbons having 1 to 6 carbon atoms; aromatic hydrocarbons such as benzene and toluene; halogenated hydrocarbons such as methylene chloride and chloroform; lower alkyl ethers having 2 to 5 carbon atoms; and polar solvents such as N,N-dimethyl formamide and dimethyl sulfoxide. These solvents may be used alone or in the form of a mixture of any two or more thereof. Among these solvents, from the viewpoint of a good reactivity upon the oxidation reaction of the cellulose, preferred are water, alcohols having 1 to 6 carbon atoms, ketones having 3 to 6 carbon atoms, lower alkyl ethers having 2 to 5 carbon atoms, and polar solvents such as N,N-dimethyl formamide and dimethyl sulfoxide. From the viewpoint of preventing consumption of the oxidizing agent, owing to oxidation reaction of the solvent, more preferred are water and secondary or tertiary alcohols having 3 to 6 carbon atoms, and from the viewpoint of reduction in burden on the environments, water is especially preferred.

The solvent may be used in an effective amount capable of dispersing the low-crystalline cellulose therein, and is preferably from 1.0 to 500 times by weight and more preferably from 2.0 to 100 times by weight on the basis of the low-crystalline cellulose although it is not particularly limited thereto.

(Conditions of Oxidation Reaction)

The temperature used in the oxidation reaction is preferably 50° C. or lower, more preferably 40° C. or lower and still more preferably 20° C. or lower from the viewpoints of a good selectivity of the reaction and less occurrence of side reactions. The lower limit of the oxidation reaction temperature is preferably −5° C. or higher.

The pH value of the reaction system is preferably determined according to properties of the co-oxidizer used. For example, when using sodium hypochlorite as the co-oxidizer, the pH value of the reaction system is preferably adjusted to that of an alkali side, more specifically, the pH value of the reaction system is preferably adjusted to from 7 to 13 and more preferably from 10 to 13.

(Purification)

The polyuronic acid obtained from the above oxidation reaction contains the N-oxyl compound such as TEMPO used as the catalyst and by-produced salts. The thus obtained polyuronic acid may be directly subjected as such to the next step for introducing a hydrophobic group thereinto. In addition, the polyuronic acid may be subjected to purification treatments before the next step for introducing a hydrophobic group thereto in order to increase a purity of the resulting polyuronic acid. As the purification treatments, optimum methods may be adopted according to kind of solvent used in the oxidation reaction, extent of oxidation of the reaction product and degree of purification of the final product. Examples of the purification treatments include re-precipitation using water as a good solvent and methanol, ethanol, acetone, etc., as a poor solvent, extraction of TEMPO, etc., in a solvent such as hexane which is capable of being separated from a water phase, ion exchange for removal of the salts and dialysis.

(Introduction of Hydrophobic Group into Raw Polyuronic Acid)

The introduction of a hydrophobic group into the raw polyuronic acid can be carried out by reacting a carboxy group of the raw polyuronic acid or a salt thereof with a hydrophobic agent.

Examples of the hydrophobic agent include glycidyl ethers, epoxides, halides, acid halides, alcohols, primary amines and thiols, which all contain a hydrocarbon group having 1 to 40 carbon atoms.

The preferred examples and specific examples of the hydrocarbon group having 1 to 40 carbon atoms which are contained in the above compounds are the same as those of the hydrocarbon group having 1 to 40 carbon atoms as IV in the general formula (1).

As the halogen element in the halides, from the viewpoint of a good reactivity, iodine and bromine are preferred.

When using the glycidyl ethers or epoxides containing the hydrocarbon group having 1 to 40 carbon atoms as the hydrophobic agent, it is possible to respectively introduce a —$CH_2$—CH(OH)—$R^2$ group or a —$CH_2$—CH(OH)—$CH_2$—O—$R^2$ group into the carboxy group of the raw polyuronic acid.

Also, when using the halides, alcohols, primary amines or thiols containing the hydrocarbon group having 1 to 40 carbon atoms as the hydrophobic agent, it is possible to introduce the hydrocarbon group having 1 to 40 carbon atoms into a part or whole of carboxy groups of the raw polyuronic acid.

The hydrophobic agents may be used alone or in combination of any two or more thereof.

From the viewpoints of a good chemical stability and a good reactivity of the hydrophobic agent, among the above hydrophobic agents, preferred are primary amines, glycidyl ethers, epoxides and halides containing a hydrocarbon group having 1 to 40 carbon atoms and preferably 4 to 24 carbon atoms, more preferred are primary amines containing an alkyl group having 4 to 12 carbon atoms and halides containing an alkyl group having 10 to 20 carbon atoms, and especially preferred are primary amines containing an alkyl group having 5 to 10 carbon atoms.

The amount of the hydrophobic agent used may be suitably selected according to the hydrophobic group substitution degree as desired, and is not particularly limited because the reaction yield may vary depending upon the reaction conditions. The hydrophobic agent is preferably used in an amount of from 0.01 to 10 mol, more preferably from 0.05 to 5 mol and still more preferably from 0.1 to 2 mol per 1 mol as a total molar number of the carboxy groups in the raw polyuronic acid.

The reaction of the carboxy group of the raw polyuronic acid or the salt thereof with the hydrophobic agent may be carried out in the presence of a catalyst, a condensation agent and a solvent, if required.

The catalyst used in the reaction is not particularly limited. Examples of the catalyst include hydroxides, carbonates and bicarbonates of alkali metals, alkali earth metals or tetraalkyl (number of carbon atoms in the alkyl group: 1 to 6) quaternary ammonium, and trifluoroboron.

The condensation agent is not particularly limited, and there may be used condensation agents described in "Synthetic Chemistry Series-Peptide Synthesis" (Maruzen K.K.), p 116, or "Tetrahedron", 57, 1551 (2001), etc.

Examples of the solvent used in the above reaction include water; lower alcohols having 1 to 4 carbon atoms such as methanol, ethanol, isopropyl alcohol and butyl alcohol, ketones having 3 to 6 carbon atoms such as methyl ethyl ketone and methyl isobutyl ketone, sulfoxides having 2 to 8 carbon atoms such as dimethyl sulfoxide and dipropyl sulfoxide, N,N-dimethyl formamide, N,N-dimethyl acetamide, tetrahydrofuran, pyridine, N-methyl-2-pyrrolidone, α-picoline, β-picoline, γ-picoline, 2,4-lutidine, 2,6-lutidine, piperidine, pyrrolidine, quinoline, isoquinoline and 4-dimethylaminopyridine. Among these solvents, from the viewpoint of reducing burden on environments, water is preferred. These solvents may be used alone or in the form of a mixture of any two or more thereof.

The temperature used in the reaction for introducing the hydrophobic group into the raw polyuronic acid is preferably from 0 to 200° C. and more preferably from 20 to 100° C. from the viewpoints of a good thermal stability of the raw cellulose and a high reactivity of the hydrophobic agent. The reaction time is preferably from 0.5 to 50 h.

The thus obtained modified polyuronic acid and the salt thereof may be used as a high-molecular surfactant directly as such or after washed with ethanol, etc.

EXAMPLES

In the following Examples, the weight-average molecular weight, hydrophobic group substitution degree, carboxy group substitution degree (MPU) and surface tension of the modified polyuronic acid as well as the carboxy group substitution degree (PU) of the raw polyuronic acid were measured by the following methods.

(1) Measurement of Weight-Average Molecular Weight

The weight-average molecular weight (Mw) of the modified polyuronic acid was measured by gel permeation chromatography (GPC) using a high-performance liquid chromatograph "L-6000" available from Hitachi Ltd., under the following conditions.

Detector: Differential refraction index detector "Shodex RI SE-61";

Column: "G4000PWXL+G2500PWXL" available from Tosoh Corp.;

Eluent: 0.2M phosphoric acid buffer solution (pH: 7.0)/acetonitrile (volume ratio: 9/1; 20 μL of the eluent adjusted to a concentration of 0.5 g/100 mL was used);

Column temperature: 40° C.; Flow rate: 1.0 mL/min; Standard polymer:

Pullulan (2) Measurement of Hydrophobic Group Substitution Degree

The modified polyuronic acid was diluted with heavy water to adjust its concentration to 0.1 g/10 g, and subjected to measurement of $^1$H-NMR spectrum. The measurement of $^1$H-NMR spectrum was carried out using "Mercury 400 (400 MHz)" available from Varian Inc. The hydrophobic group substitution degree was calculated from a ratio between an integral value derived from a polysaccharide skeleton in the range of from 3.0 to 4.5 ppm and an integral value derived from an alkyl group in the range of from 0.5 to 2.0 ppm. Meanwhile, in the case where the hydrophobic group is an aryl group, the hydrophobic group substitution degree is calculated by using an integral value derived from an aryl group in the range of from 6.5 to 8.0 ppm in place of the integral value derived from an alkyl group in the range of from 0.5 to 2.0 ppm.

(3) Measurement of Carboxy Group Substitution Degree (MPU)

Fifty grams of a 2% aqueous solution of the modified polyuronic acid were prepared, and 6N hydrochloric acid was added thereto to adjust a pH of the aqueous solution to 1 or less. The thus prepared acid solution was added to 500 mL of ethanol, and the resulting precipitate was recovered and washed with ethanol several times and then dried. The obtained modified polyuronic acid was accurately weighed in an amount of 0.1 g, and dissolved or dispersed in 30 mL of ion-exchanged water. The resulting solution or dispersion was subjected to titration with a 0.1N sodium hydroxide aqueous solution using phenolphthalein as an indicator to determine a content of carboxy groups per a unit weight of the modified polyuronic acid, and further the carboxy group substitution degree (MPU) was calculated from the content of carboxy groups according to the above calculation formula (1).

(4) Measurement of Carboxy Group Substitution Degree (PU)

Fifty grams of a 2% aqueous solution of polyuronic acid were prepared, and 6N hydrochloric acid was added thereto to adjust a pH of the aqueous solution to 1 or less. The thus prepared acid solution was added to 500 mL of ethanol, and the resulting precipitate was recovered and washed with ethanol several times and then dried. The obtained polyuronic acid was accurately weighed in an amount of 0.1 g, and dissolved or dispersed in 30 mL of ion-exchanged water. The resulting solution or dispersion was subjected to titration with a 0.1N sodium hydroxide aqueous solution using phenolphthalein as an indicator to determine a content of carboxy groups per a unit weight of the polyuronic acid, and further the carboxy group substitution degree (PU) was calculated from the content of carboxy groups according to the above calculation formula (2).

(5) Measurement of Surface Tension

A 0.1% aqueous solution of each of the compounds 1 to 10 obtained in the following Examples and Comparative Examples was prepared in an amount of 20 g, and then allowed to stand for 12 h to measure a surface tension thereof by the method using a Wilhelmy platinum plate.

Measuring apparatus: "Tensionmeter K100" available from Kruss GmbH

Measuring temperature: 25° C.

Example 1

Synthesis of Compound 1

(Oxidation Step)

Three grams of a cellulose powder "KC Flock W-400G" available from Nippon Paper Chemicals, Co., Ltd., were pulverized using a planetary ball mill available from Fritsch GmbH for 10 min (rotating speed: 400 rpm) and then allowed to stand for 10 min. This procedure was repeated 6 times to obtain a low-crystalline cellulose powder (crystallinity: 0%).

A 1 L beaker equipped with a pH meter was charged with 0.20 g of 2,2,6,6-tetramethyl piperidine-1-oxyl ("TEMPO" (tradename) available from Aldrich Corp.), 100 g of water and 3 g of the low-crystalline cellulose powder, and the contents in the beaker were stirred by a stirrer at 200 rpm. While maintaining the contents of the beaker at a temperature of 25° C., 29 g of a 11% sodium hypochlorite aqueous solution (available from. Wako Pure Chemical Industries, Ltd.) were added dropwise into the beaker. With the progress of the oxidation reaction, the pH of the reaction solution was decreased. In order to maintain the pH value of the reaction solution near 8.5, a 0.5N sodium hydroxide aqueous solution was gradually added thereto using a microtube pump. It was confirmed that after completion of dropping the sodium hypochlorite aqueous solution and the sodium hydroxide aqueous solution, the reaction mixture was kept substantially uniform and transparent.

After completion of the reaction, 1 L of ethanol was poured into the obtained reaction mixture to precipitate a white solid. The resulting precipitate was recovered, washed with acetone, and then dried at 40° C., thereby obtaining 3 g of white sodium polyuronate.

The thus obtained compound was subjected to $^{13}$C-NMR measurement (using "Mercury 400" available from Varian Inc.; measuring frequency: 100 MHz). As a result of the measurement, the peak near 60 ppm derived from the carbon atom at the C6-position to which a hydroxyl group of an anhydroglucose constituting the cellulose skeleton as a substituent group was bonded, disappeared, and the peak attributed to the oxidized carbon atom at the C6-position of the cellulose was observed near 180 ppm. From the measurement results, it was confirmed that the carbon atom at the C6-position of the cellulose was selectively oxidized.

(Hydrophobilizing Step)

In a four-necked separable flask equipped with a stirrer, a Dimroth reflux condenser and a thermometer, 3 g (15 mmol) of the sodium polyuronate synthesized by the above-mentioned method (carboxy group substitution degree (PU): 0.90; weight-average molecular weight: 20,000) were dissolved in 30 g of ion-exchanged water. The resulting solution was mixed with 1N hydrochloric acid to adjust a pH of the solution to 3, and then 1.5 g (15 mmol) of n-hexyl amine, 22.5 g of isopropyl alcohol and 4.6 g of 4-(4,6-dimethoxy-1,3,5-triazin-2-yl)-4-methyl morpholinium chloride n-hydrate (available from Wako Pure Chemical Industries, Ltd.) were added thereto, and the reaction mixture was stirred at room temperature for 3 h. The resulting reaction solution was added dropwise into 500 mL of isopropyl alcohol, and the thus produced precipitate was recovered to obtain a modified polyuronic acid. The thus obtained modified polyuronic acid was dispersed in 30 g of ion-exchanged water and neutralized with a 1N sodium hydroxide aqueous solution to adjust a pH thereof to 7.0, and then added dropwise to 200 mL of acetone to recover the resulting precipitate and thereby obtain a sodium salt of the modified polyuronic acid (compound 1).

The thus obtained compound 1 was subjected to measurement of $^{1}$H-NMR spectrum (using "Mercury 400" available from Varian Inc.; measuring frequency: 400 MHz). As a result, it was confirmed that the peak derived from a sugar skeleton was observed near 3.0 to 4.5 ppm, and the peak derived from an alkyl group was observed near 0.5 to 1.5 ppm. Also, in IR spectrum of the compound 1 (as measured using "FT-700" available from Horiba Seisakusho Co., Ltd.), the peak corresponding to a carboxylate ion was observed near 1600 and further the peak corresponding to an amide group was observed near 1650 cm$^{-1}$. From the results of all of the above GPC, $^{1}$H-NMR spectrum and IR spectrum, it was totally confirmed that the compound 1 was the salt of the modified polyuronic acid represented by the above general formula (1).

The thus obtained compound 1 had a weight-average molecular weight of 20,000, a hydrophobic group substitution degree of 0.29, a carboxy group substitution degree (MPU) of 0.61, and a 0.1% aqueous solution of the compound 1 exhibited a surface tension of 32 mN/m.

The weight-average molecular weight, carboxy group substitution degree (MPU) and hydrophobic group substitution degree of the obtained compound 1 are shown together with the measurement results of surface tension thereof in Table 1.

The surface tension of the compound 1 was repeatedly carried out while varying the concentration of the aqueous solution thereof, and the surface tension values measured at the respective concentrations of the aqueous solution are collectively shown in Table 2.

Example 2

Synthesis of Compound 2

(Oxidation Step)

In a four-necked separable flask equipped with a stirrer, a Dimroth reflux condenser and a thermometer, the oxidation step was carried out in the same manner as in Example 1 to obtain sodium polyuronate. Then, 25.4 g of the resulting sodium polyuronate were dissolved in 600 g of ion-exchanged water, and the obtained solution was mixed with 35% hydrochloric acid to adjust a pH of the solution to 2.0, thereby obtaining a white precipitate. The thus obtained white precipitate was washed with acetone to obtain polyuronic acid (carboxy group substitution degree (PU): 0.81; weight-average molecular weight: 20,000). Next, 2.1 g (13 mmol) of the resulting polyuronic acid were dissolved in 30 g of ion-exchanged water, and then 24.6 g of a 10% tetrabutyl ammonium hydroxide aqueous solution were added to the obtained solution to adjust a pH of the solution to 8. Thereafter, the obtained solution was freeze-dried to obtain a tetrabutyl ammonium salt of polyuronic acid.

(Hydrophobilizing Step)

The resulting compound was mixed with 80 mL of dimethyl sulfoxide and 0.86 g (3 mmol) of 1-iododecane, and the obtained mixture was stirred at room temperature for 24 h. The resulting mixture was poured into 400 mL of acetone to thereby obtain a white solid. The thus obtained white solid was mixed with 80 mL of ion-exchanged water and uniformly dissolved therein, and then the pH of the obtained solution was adjusted to 2.0 using 1M hydrochloric acid, and further the resulting solution was poured into 400 mL of acetone to precipitate a white solid. The thus obtained white solid was mixed with 80 mL of ion-exchanged water, and then a 1N sodium hydroxide aqueous solution was added to the obtained mixture to adjust a pH thereof to 8.0, and further the resulting mixture was poured into 400 mL of acetone to thereby obtain a sodium salt of the modified polyuronic acid (compound 2).

The thus obtained compound 2 was subjected to measurement of $^1$H-NMR spectrum. As a result, it was confirmed that the peak derived from a sugar skeleton was observed near 3.0 to 4.5 ppm, and the peak derived from an alkyl group was observed near 0.5 to 1.5 ppm. Also, in IR spectrum of the compound 2, the peak corresponding to a carboxylate ion was observed near 1600 cm$^{-1}$, and further the peak corresponding to an ester group was observed at 1750 cm$^{-1}$. From the results of all of the above GPC, $^1$H-NMR spectrum and IR spectrum, it was totally confirmed that the compound 2 was the salt of the modified polyuronic acid represented by the above general formula (1).

The thus obtained compound 2 had a weight-average molecular weight of 24,000, a hydrophobic group substitution degree of 0.23, a carboxy group substitution degree (MPU) of 0.58.

The weight-average molecular weight, carboxy group substitution degree (MPU) and hydrophobic group substitution degree of the obtained compound are shown in Table 1.

Example 3

Synthesis of Compound 3

The same synthesis procedure as in Example 1 was repeated except that the amount of n-hexyl amine used in the hydrophobilizing step was changed to the amount shown in Table 1, thereby obtaining a compound 3. As a result of identifying the thus obtained compound 3 in the same manner as in Example 1, it was confirmed that the compound 3 was the salt of the modified polyuronic acid represented by the general formula (1). The weight-average molecular weight, carboxy group substitution degree (MPU) and hydrophobic group substitution degree of the obtained compound 3 are shown together with the measurement results of surface tension thereof in Table 1.

TABLE 1

| | | | | Example 1 Compound 1 | Example 2 Compound 2 | Example 3 Compound 3 |
|---|---|---|---|---|---|---|
| Raw materials used in hydrophobilizing step | Polysaccharide | Kind | | Polyuronic acid[1] | Polyuronic acid[1] | Polyuronic acid[1] |
| | | Amount | (g) | 3.0 | 2.1 | 3.0 |
| | Hydrophobic agent | Kind | | n-Hexylamine | n-Iododecane | n-Hexylamine |
| | | Amount | (g) | 1.5 | 0.86 | 1.3 |
| | | | equivalent | 1 | 0.23 | 0.87 |
| Reaction product | Weight-average molecular weight (Mw) | | | 20000 | 24000 | 24000 |
| | Carboxy group substitution degree (MPU) | | | 0.61 | 0.58 | 0.56 |
| | Hydrophobic group substitution degree [a/(m + n)] | | | 0.29 | 0.23 | 0.25 |
| | Surface tension | | (mN/m) | 32 | 38 | 41 |

Note
[1]Polyuronic acid salts obtained in oxidation step of the respective Examples.

Examples 4 to 6

Synthesis of Compounds 4 to 6

The same synthesis procedure as in Example 2 was repeated except that the kind and amount of the alkyl halide used in the hydrophobilizing step were changed to those shown in Table 2, thereby obtaining compounds 4 to 6. As a result of identifying the thus obtained compounds 4 to 6 in the same manner as in Example 2, it was confirmed that the compounds 4 to 6 all were in the form of the salt of the modified polyuronic acid represented by the general formula (1). The weight-average molecular weight, carboxy group substitution degree (MPU) and hydrophobic group substitution degree of the obtained compounds 4 to 6 are shown together with the measurement results of surface tension thereof in Table 2.

TABLE 2

|  |  |  |  | Example 4<br>Compound 4 | Example 5<br>Compound 5 | Example 6<br>Compound 6 |
|---|---|---|---|---|---|---|
| Raw materials used in hydrophobilizing step | Polysaccharide | Kind | | Polyuronic acid[1] | Polyuronic acid[1] | Polyuronic acid[1] |
| | | Amount | (g) | 2.1 | 2.1 | 2.1 |
| | Hydrophobic agent | Kind | | 1-Iodododecane | 1-Iodohexadecane | 1-Iodohexadecane |
| | | Amount | (g) | 0.43 | 0.81 | 0.54 |
| | | | equivalent | 0.1 | 0.15 | 0.1 |
| Reaction product | Weight-average molecular weight (Mw) | | | 21000 | 23000 | 24000 |
| | Carboxy group substitution degree (MPU) | | | 0.69 | 0.64 | 0.69 |
| | Hydrophobic group substitution degree $[a/(m+n)]$ | | | 0.12 | 0.17 | 0.12 |
| | Surface tension | | (mN/m) | 26 | 25 | 24 |

Note
[1] Polyuronic acid salts obtained in oxidation step of the respective Examples.

Comparative Examples 1 to 3

Synthesis of Compounds 7 to 9

The same synthesis procedure as in Example 1 was repeated except that a carboxymethyl cellulose (CMC) was used instead without using the polyuronic acid salt as the raw material for the hydrophobilizing step and the amount of n-hexyl amine used in the hydrophobilizing step was changed as shown in Table 3, thereby obtaining compounds 7 to 9. Meanwhile, the CMC used as the raw material was prepared by treating "SUNROSE FT-1" (carboxy-methylation degree: 0.9; weight-average molecular weight: 600,000) available from Nippon Paper Chemicals, Co., Ltd., with an acid to reduce a molecular weight thereof. The weight-average molecular weight, carboxy-methylation degree, hydrophobic group substitution degree of the respective compounds thus obtained are shown together with the measurement results of surface tension thereof in Table 3.

Meanwhile, the hydrophobic group substitution degree of the respective compounds were determined by subjecting the compounds to $^1$H-NMR measurement similarly to the measurement of the hydrophobic group substitution degree of the modified polyuronic acid, and the difference between the carboxy-methylation degree of the raw CMC and the hydrophobic group substitution degree was regarded as the carboxy-methylation degree of the respective obtained compounds.

The compound 7 was subjected to measurement of its surface tension while varying a concentration of an aqueous solution thereof. The surface tensions as measured at the respective concentrations are collectively shown in Table 4. Meanwhile, in Table 4, since the aqueous solution of the compound 7 having a concentration of 30000 mg/kg exhibited a remarkably excessively increased viscosity, the surface tension thereof was not measured.

Comparative Example 4

Synthesis of Compound 10

The same procedure as in Example 1 was repeated except that no hydrophobic group was introduced, thereby obtaining a compound 10.

The thus obtained compound 10 had a weight-average molecular weight of 20000 and a carboxy group substitution degree (PU) of 0.9, and a 0.1% aqueous solution of the compound 10 had a surface tension of 69 mN/m. The weight-average molecular weight and carboxy group substitution degree (PU) of the compound 10 are shown together with the measurement result of its surface tension in Table 3.

TABLE 3

|  |  |  |  | Comparative Example 1<br>Compound 7 | Comparative Example 2<br>Compound 8 | Comparative Example 3<br>Compound 9 | Comparative Example 4<br>Compound 10 |
|---|---|---|---|---|---|---|---|
| Raw materials used in hydrophobilizing step | Polysaccharide | Kind | | CMC | CMC | CMC | Polyuronic acid[1] |
| | | Weight-average molecular weight | | 80000 | 20000 | 150000 | 20000 |
| | | Amount | (g) | 3.0 | 3.0 | 3.0 | 3.0 |
| | Hydrophobic agent | Kind | | n-Hexylamine | n-Hexylamine | n-Hexylamine | — |
| | | Amount | (g) | 0.80 | 1.31 | 1.60 | — |
| | | | equivalent | 0.5 | 0.8 | 1 | — |
| Reaction product | Weight-average molecular weight | | | 88000 | 15000 | 180000 | 20000 |
| | Carboxy group substitution degree (MPU) | | | 0.57 | 0.41 | 0.71 | 0.9[2] |
| | Hydrophobic group substitution degree $[a/(m+n)]$ | | | 0.33 | 0.49 | 0.19 | 0 |
| | Surface tension | | (mN/m) | 61 | 57 | 69 | 69 |

Note
[1] Polyuronic acid salt obtained in oxidation step of Example 10.
[2] Carboxy group substitution degree (PU)

TABLE 4

| | Surface tension (mN/m) | |
|---|---|---|
| Concentration (mg/kg) | Compound 1 | Compound 7 |
| 10 | 72.74 | 73.71 |
| 50 | 65.24 | — |
| 100 | 54.75 | 73.21 |

TABLE 4-continued

| Concentration (mg/kg) | Surface tension (mN/m) | |
|---|---|---|
| | Compound 1 | Compound 7 |
| 200 | 49.88 | — |
| 500 | 39.64 | 64.86 |
| 1000 | 32.70 | 61.93 |
| 2000 | 29.18 | 58.41 |
| 5000 | 26.10 | 51.86 |
| 10000 | 26.22 | 45.80 |
| 20000 | 26.37 | 42.25 |

From the comparison between Examples and Comparative Examples as shown in Tables 1 to 3, it was apparently recognized that the modified polyuronic acids of the present invention exhibited a low surface tension as measured at the given concentrations, and therefore had a high surface activity.

In addition, from the results shown in Table 4, it was confirmed that the surface tensions which were able to be reached by the modified polyuronic acid of the present invention were lower than those of the CMC into which the hydrophobic group was introduced, and therefore the modified polyuronic acid of the present invention had a high surface activity.

INDUSTRIAL APPLICABILITY

The modified polyuronic acid or a salt thereof according to the present invention is excellent in surface activity and therefore can be suitably used as a high-molecular surfactant.

The invention claimed is:

1. A modified polyuronic acid represented by the following general formula (1) or a salt thereof:

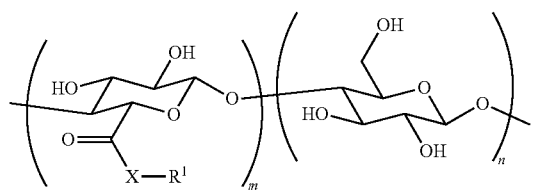

(1)

wherein $R^1$ is a hydrogen atom, a hydrocarbon group having 1 to 40 carbon atoms, a —$CH_2$—$CH(OH)$—$R^2$ group or a —$CH_2$—$CH(OH)$—$CH_2$—$O$—$R^2$ group wherein $R^2$ is a hydrocarbon group having 1 to 40 carbon atoms; X is an oxygen atom, a sulfur atom or a —NH— group; m is a number indicating an average polymerization degree of an anhydroglucuronic acid represented by the following general formula (2); and n is a number indicating an average polymerization degree of an anhydroglucose, with the proviso that a ratio value of [m/(m+n)] is from 0.3 to 1.0, and a plurality of the $R^1$ groups being present in a molecule of the modified polyuronic acid or the salt thereof may be the same or different from each other but all of the $R^1$ groups are not hydrogen atoms at the same time:

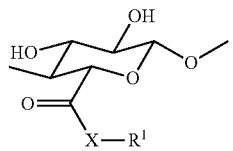

(2)

wherein X and $R^1$ are respectively the same as defined above, and wherein the modified polyuronic acid or the salt thereof has a weight-average molecular weight of from 5000 to 500,000.

2. The modified polyuronic acid or the salt thereof according to claim 1, wherein a ratio of an average number (a) of the hydrocarbon groups per one molecule of the modified polyuronic acid or the salt thereof to (m+n) [a/(m+n)] is from 0.01 to 0.9.

3. The modified polyuronic acid or the salt thereof according to claim 1, wherein in each of the general formulae (1) and (2), $R^1$ is a hydrogen atom or a linear or branched alkyl group or alkenyl group having 1 to 40 carbon atoms.

4. The modified polyuronic acid or the salt thereof according to claim 1, wherein in each of the general formulae (1) and (2), $R^1$ is a hydrogen atom or a linear or branched alkyl group or alkenyl group having 4 to 24 carbon atoms.

5. The modified polyuronic acid or the salt thereof according to claim 1, wherein in each of the general formulae (1) and (2), $R^1$ is a hydrogen atom or a linear or branched alkyl group or alkenyl group having 5 to 18 carbon atoms.

6. The modified polyuronic acid or the salt thereof according to claim 1, wherein the modified polyuronic acid or the salt thereof has a weight-average molecular weight of from 6000 to 100,000.

7. The modified polyuronic acid or the salt thereof according to claim 1, wherein the modified polyuronic acid or the salt thereof has a weight-average molecular weight of from 10,000 to 50,000.

8. The modified polyuronic acid or the salt thereof according to claim 1, wherein a ratio value of [m/(m+n)] in the general formula (1) is 0.6 or more.

9. The modified polyuronic acid or the salt thereof according to claim 1, wherein a ratio value of [m/(m+n)] in the general formula (1) is 0.95 or less.

10. The modified polyuronic acid or the salt thereof according to claim 2, wherein the ratio of [a/(m+n)] is from 0.1 to 0.5.

11. The modified polyuronic acid or the salt thereof according to claim 1, wherein X in the general formula (1) is an oxygen atom or a —NH— group.

12. A method of lowering a surface tension of a water comprising dissolving or dispersing the modified polyuronic acid or the salt thereof according to claim 1 in water.

* * * * *